(12) United States Patent
Shen et al.

(10) Patent No.: US 7,010,035 B2
(45) Date of Patent: Mar. 7, 2006

(54) QUANTIZATION MATRIX FOR STILL AND MOVING PICTURE CODING

(75) Inventors: Sheng Mei Shen, Singapore (SG); Thiow Keng Tan, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 602 days.

(21) Appl. No.: 10/282,127

(22) Filed: Oct. 29, 2002

(65) Prior Publication Data

US 2003/0067980 A1 Apr. 10, 2003

Related U.S. Application Data

(63) Continuation of application No. 09/855,541, filed on May 16, 2001, now Pat. No. 6,501,793, which is a continuation of application No. 09/147,064, filed as application No. PCT/JP98/00474 on Feb. 5, 1998, now Pat. No. 6,445,739.

(30) Foreign Application Priority Data

Feb. 8, 1997 (JP) ..................................... 9-61647
Jul. 11, 1997 (JP) ................................... 9-186437

(51) Int. Cl.
*H04N 7/32* (2006.01)
(52) U.S. Cl. ................................. 375/240.03
(58) Field of Classification Search ..............................
375/240.01–240.07, 240.12–240.16, 240.18,
375/240.2, 240.25; 382/232, 236, 238, 248,
382/250, 251; H04N 7/32
See application file for complete search history.

(56) References Cited

U.S. PATENT DOCUMENTS 5,237,410 A * 8/1993 Inoue .................... 375/240.12
5,245,427 A 9/1993 Kunihiro
5,301,242 A 4/1994 Gonzalez et al.
5,333,012 A * 7/1994 Singhal et al. ......... 375/240.04
5,335,016 A 8/1994 Nakagawa
5,426,512 A 6/1995 Watson
5,500,678 A 3/1996 Puri
5,535,138 A 7/1996 Keith
5,539,468 A 7/1996 Suzuki et al.
5,559,557 A 9/1996 Kato
5,572,236 A 11/1996 Feig et al.
5,612,742 A 3/1997 Krause et al.
5,661,523 A 8/1997 Yamane
5,677,734 A * 10/1997 Oikawa et al. ........ 375/240.04
5,689,346 A 11/1997 Noda et al.
5,701,386 A 12/1997 Yoneyama
5,930,398 A 7/1999 Watney
5,933,533 A 8/1999 Fukuda et al.
2003/0095594 A1 * 5/2003 Laksono et al. ....... 375/240.03

FOREIGN PATENT DOCUMENTS

EP 0740472 10/1996
EP 0741497 11/1996

* cited by examiner

*Primary Examiner*—Richard Lee
(74) *Attorney, Agent, or Firm*—Greenblum & Bernstein, P.L.C.

(57) ABSTRACT

A transmission method for transmitting coefficients representing image data is provided. The transmission method includes transmitting coded quantized coefficients obtained by coding quantized coefficients. The quantized coefficients are obtained by quantizing the coefficients using a complete quantization matrix having multiple quantization elements. The transmission method also includes transmitting a coded quantization matrix obtained by coding a truncated quantization matrix. The truncated quantization matrix is generated by truncating the complete quantization matrix. The coded quantization matrix has bits aligned in the order of bits obtained by coding the quantization elements included in the truncated quantization matrix and bits obtained by coding an end code.

3 Claims, 9 Drawing Sheets

Fig.1A

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Fig.1B

| 8   | 18  | 22  | 44  | 78  | 200 | 200 | 200 |
|-----|-----|-----|-----|-----|-----|-----|-----|
| 18  | 18  | 25  | 48  | 71  | 200 | 200 | 200 |
| 22  | 25  | 29  | 54  | 87  | 200 | 200 | 200 |
| 44  | 44  | 52  | 54  | 87  | 200 | 200 | 200 |
| 66  | 78  | 81  | 87  | 96  | 200 | 200 | 200 |
| 200 | 200 | 200 | 200 | 200 | 200 | 200 | 200 |
| 200 | 200 | 200 | 200 | 200 | 200 | 200 | 200 |
| 200 | 200 | 200 | 200 | 200 | 200 | 200 | 200 |

Fig.2A

The Quantization Matrix is truncated at this point.

Fig.2B

| 8  | 18  | 22  | 44  | 78  | 78  | 87  | 108 |
| 18 | 18  | 25  | 48  | 71  | 87  | 96  | 118 |
| 22 | 25  | 29  | 54  | 87  | 96  | 108 | 123 |
| 44 | 44  | 52  | 54  | 87  | 96  | 108 | 132 |
| 66 | 78  | 81  | 87  | 96  | 108 | 115 | 140 |
| 78 | 78  | 87  | 96  | 108 | 115 | 123 | 158 |
| 87 | 87  | 95  | 108 | 115 | 123 | 132 | 167 |
| 96 | 108 | 118 | 123 | 132 | 140 | 158 | 200 |

| S*x1 | x2 | x6 | x7 | 0 | 0 | 0 | 0 |
|------|----|----|----|---|---|---|---|
| x3 | x5 | x8 | 0 | 0 | 0 | 0 | 0 |
| x4 | x9 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 9

QUANTIZATION MATRIX FOR STILL AND MOVING PICTURE CODING

This is a continuation of U.S. patent application Ser. No. 09/855,541, filed May 16, 2001, now U.S. Pat. No. 6,501,793, which is a continuation of U.S. patent application Ser. No. 09/147,064, filed Sep. 29, 1998, which is now U.S. Pat. No. 6,445,739, which is a U.S. National Phase of PCT/JP98/00474 filed Feb. 5, 1998 the contents of each expressly incorporated by reference herein their entireties. The International Application was published in English.

TECHNICAL FIELD

This invention is particularly useful in the coding of still and moving pictures at very high compression. It is suitable for use in video conferencing applications over standard telephone lines as well as for other applications that require high compression.

BACKGROUND ART

In most compression algorithms some form of loss in the decoded picture is expected. A typical method for compression that produces good results is to introduce this loss by quantizing the signal in the transform domain instead of the pixel domain. Examples of such transforms are the Discrete Cosine Transform, DCT, the wavelet transforms and the subband analysis filters. In a transform based compression algorithm, the picture is converted into the transform domain and a quantization scheme is applied to the coefficients to reduce the amount of information. The transformation has the effect of concentrating the energy into a few coefficients and noise can be introduced into these coefficients without affecting the perceived visual quality of the reconstructed picture.

It is well known that some form of human visual perception system with different weighting on the quantization on different coefficients can improve the perceived visual quality. In coding standards such as the ISO/IEC JTC1/SC29/WG11 IS-13818-2(MPEG2), the quantization of the DCT coefficients are weighted by the quantization matrix. A default matrix is normally used however the encoder can choose to send new values of the quantization matrix to the decoder. This is done through the signaling in the bitstream header.

The prior art on sending Quantization Matrix based on the MPEG-2 video standard, is to send 64 fixed values of 8-bit each if the bit signaling for using a special Quantization Matrix is set to "1".

The values of the matrix in the position of higher frequency band are actually not used, especially for very low bit rate coding where a large quantization step is employed, or for an input block with very plain texture or with good motion compensation.

It is also found that, in the above prior art, for any of Quantization Matrix used in different applications, the first value of quantization matrix is always set to eight, no matter whether it is low bit rate coding or high bit rate coding.

One problem with this method is the amount of information that need to be sent as part of the quantization matrix. In a typical case all 64 coefficients each of 8 bits are required. This represents a total of 512 bits. If three different Quantization Matrices are required for three bands of colour information, then the total bits will be three times of that amount. This represents too much overhead for low bit rate transmissions. It results in too long a set up time or latency in the transmissions should the matrix be changed in the middle of the transmission.

The second problem to be solved is the spatial masking of the human visual system. Noise in flat regions are more visible than noise in textured regions. Therefore applying the same matrix to all regions is not a good solution as the matrix is globally optimized but not locally adjusted to the activity of the local regions.

The third problem to be solved is the bit saving from the variable quantization matrix value for DC. The first value in Quantization matrix is decreased for higher bit rate and flat region and increased for lower bit rate and textured region.

DISCLOSURE OF INVENTION

To solve the above problem to reduce the transmission data, an encoding method for encoding a quantization matrix for still and moving picture, according to the present invention, comprises:

holding a default quantization matrix including a plurality of quantization elements having predetermined values;

generating a particular quantization matrix including a plurality of quantization elements having selected values;

reading said particular quantization matrix in a predetermined zigzag pattern;

terminating the reading of the particular quantization matrix at a selected position while reading in the predetermined zigzag pattern, and producing a former portion of the particular quantization matrix;

adding an end code after the quantization elements of said former portion of the particular quantization matrix;

reading said default quantization matrix in said predetermined zigzag pattern from a position immediately after said selected position, and producing a latter portion of the default quantization matrix; and synthesizing said former portion of the particular quantization matrix and said latter portion of the default quantization matrix to form a synthesized quantization matrix.

According to the present invetion, a decoding method for decoding a quantization matrix for still and moving picture comprises:

holding a default quantization matrix including a plurality of quantization elements having predetermined values;

receiving a number of quantization elements and an end code;

positioning said received quantization elements in a predetermined zigzag pattern to form a former portion, and terminating the positioning of the received quantization elements upon detection of said end code;

reading said default quantization matrix in said predetermined zigzag pattern from a position immediately after said former portion, and forming a latter portion with quantization elements from the default quantization matrix; and synthesizing said former portion of the particular quantization matrix and said latter portion of the default quantization matrix to form a synthesized quantization matrix.

According to the present invention an encoder for encoding a quantization matrix for still and moving picture comprises:

a holding member which holds a default quantization matrix including a plurality of quantization elements having predetermined values;

a generating member which generates a particular quantization matrix including a plurality of quantization elements having selected values;

a reading member which reads said particular quantization matrix in a predetermined zigzag pattern;

a terminating member which terminates the reading of the particular quantization matrix at a selected position while reading in the predetermined zigzag pattern, and producing a former portion of the particular quantization matrix;

an adding member which adds an end code after the quantization elements of said former portion of the particular quantization matrix;

a reading member which reads said default quantization matrix in said predetermined zigzag pattern from a position immediately after said selected position, and producing a latter portion of the default quantization matrix; and a synthesizing member which synthesizes said former portion of the particular quantization matrix and said latter portion of the default quantization matrix to form a synthesized quantization matrix.

According to the present invention, a decoder for decoding a quantization matrix for still and moving picture comprises:

a holding member which holds a default quantization matrix including a plurality of quantization elements having predetermined values;

a receiving member which receives a number of quantization elements and an end code;

a positioning member which positions said received quantization elements in a predetermined zigzag pattern to form a former portion, and terminating the positioning of the received quantization elements upon detection of said end code;

a reading member which reads said default quantization matrix in said predetermined zigzag pattern from a position immediately after said former portion, and forming a latter portion with quantization elements from the default quantization matrix; and a synthesizing member which synthesizes said former portion of the particular quantization matrix and said latter portion of the default quantization matrix to form a synthesized quantization matrix.

A further problems are solved by the following means.

A default matrix is designed to allow a variable number of weights to be updated by the encoder. This method of adjusting the matrix to the picture content at different degrees is hereafter referred to as truncated quantization matrix.

This truncated quantization matrix can be decided by checking coding bit rate, complexity of coded picture, as well as other aspects. It always requires a small number of non-zero values which are normally concentrated on the DC and the first few AC coefficients, especially in low bit rate coding. Furthermore these non-zero values can be coded differentially, and less than 8-bit for each value will be used to code the difference values.

The quantization weights are scaled according to the activity of the block.

The quantization weights are scaled according to the quantization step size of the block.

The present invention provides a method to increase the efficiency of using quantization matrix from both bit saving and adaptation to individual blocks.

Quantization matrix is decided based on different coding bit rate, as well as other aspects in this way: only the first few values in quantization matrix are set to non-zero with certain weighting, and others are truncated to zero, which are not coded and transmitted.

This truncated quantization matrix is scanned by zig-zag or other ways, differentially coded and transmitted, together with the number of the non-zero values, or terminated by specific symbol.

The weighting scale can be adjusted by checking the number of coefficients left after quantization, since the number of coefficients left can reflect the activity of the block. If only DC coefficient is left after quantization, then the weighting scale for DC should be smaller or equal to 8 because it is flat region, otherwise if a lot of AC coefficients are left, the weighting scale for DC can be larger, for example two times of quantization step. The same adjustment can be done for the weighting scale for AC coefficients.

BEST MODE FOR CARRYING OUT THE INVENTION

The current embodiment is divided into two parts. The first part of the embodiment describes the truncated quantization matrix. The second part of the embodiment describes the operation of the adaptive quantization step size scaling. Even though the embodiment describes the operations a one unit, both methods can be applied independently to achieve the desired outcome.

Figure 1A:
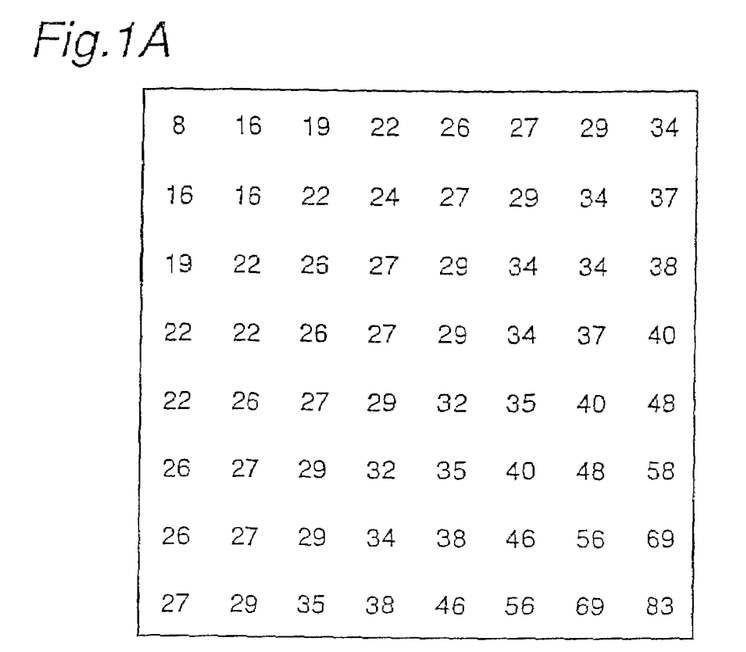
FIG. 1A shows a diagram of an example of a default quantization matrix.
Figure 1B:
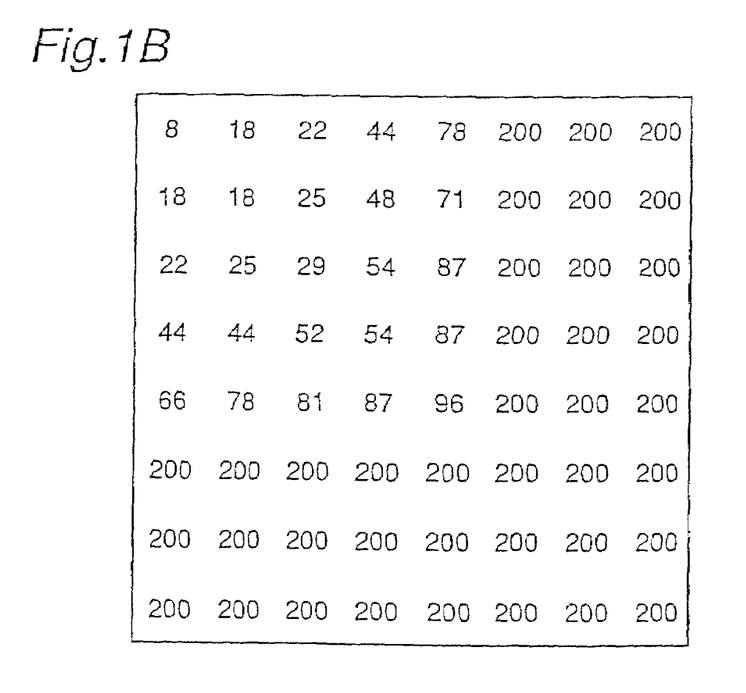
FIG. 1B shows a diagram of an example of a particular quantization matrix.

FIG. 1A shows an example of a default quantization matrix for intra Luminance (Intra-Y) frame coding, and FIG. 1B shows an example of particular quantization matrix that quantizes the high frequency coefficients more coarsely.

Figure 2A:
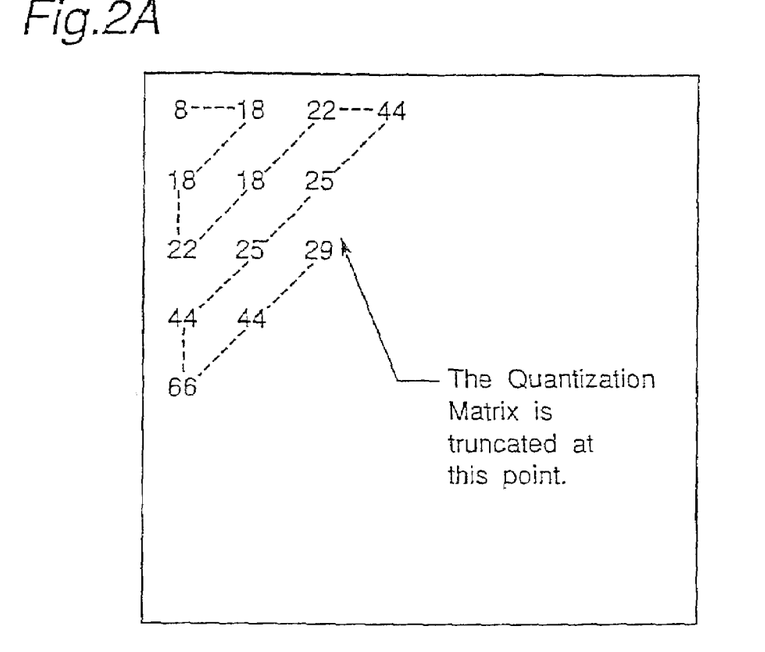
FIG. 2A shows a truncated quantization matrix according to the present invention.

FIG. 2A is an example of the truncated quantization matrix proposed by the present invention. The key to this embodiment is that the number of values in the quantization matrix to be transmitted may be less than 64. This is particularly useful especially for very low bit rate coding, where only the first 2 or 3 values are required.

Figure 4:
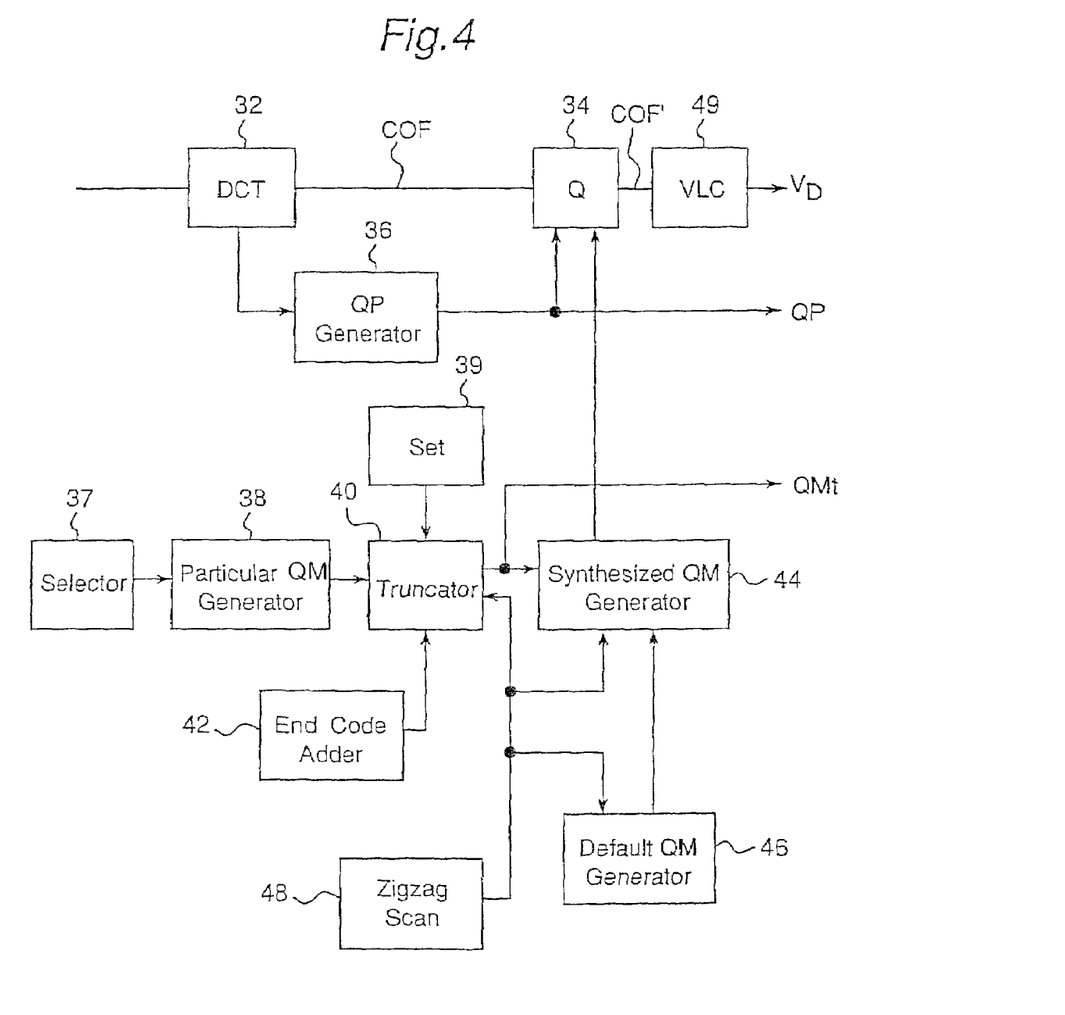
FIG. 4 is a block diagram of an encoder according to the present invention.

FIG. 4 shows an encoder, according to the present invention, using the quantization matrix for the still and moving pictures. The encoder includes a DCT converter 32, a quantizer 34, and a variable length coding unit 49. A QP generator 36 for generating quantization parameters after, e.g., every macro-block is provided. The quantization parameter can be calculated using predetermined equation after every macro-block, or can be selected from a look up table The quantization parameters as obtained are applied to the quantizer 34 and also to a decoder which will be described in detail later in connection with FIG. 5.

Figure 2B:
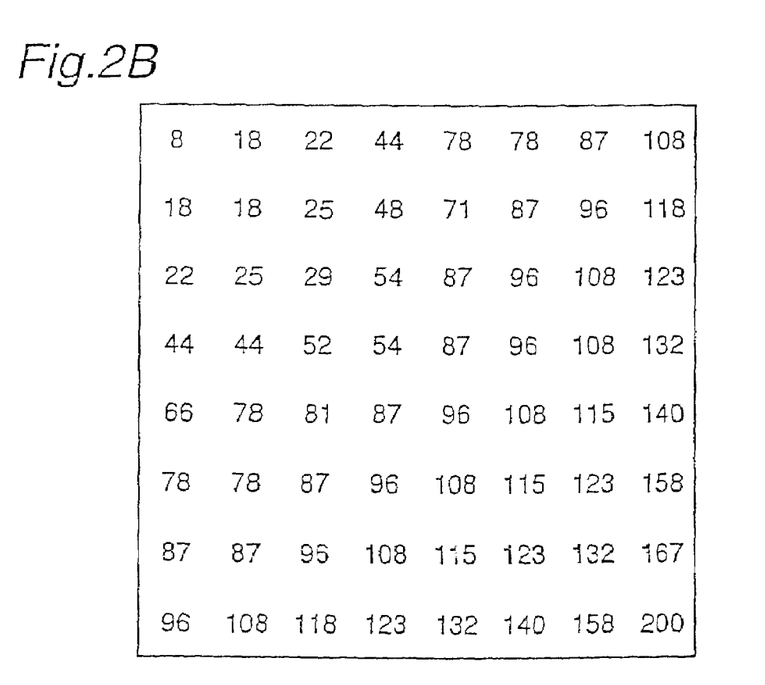
FIG. 2B shows a diagram of another example of a particular quantization matrix.

In FIG. 4, the encoder further has a particular QM generator 38 for generating particular quantization elements aligned in a matrix format. The particular quantization elements in matrix are generated after every video object layer (VOL) consisting of a plurality of layers. Examples of the particular quantization elements in matrix QM are shown in FIG. 1B and FIG. 2B. In the case where the video data is sent with less data amount (such as when the bit rate is low, or when the image is simple), the particular quantization elements shown in FIG. 1B is used in which large amount of quantization elements, such as 200, are used in the high frequency region. The particular quantization elements can be obtained by calculation or by using a suitable look up table. A selector 37 is provided for selecting parameters used in the calculation, or a suitable quantization elements in matrix from the look up table. The selector 37 can be operated manually by the user or automatically based on the type of the image (real picture or graphic picture) or the quality of the image.

The particular quantization elements in matrix QM are applied to a truncator 40. The truncator 40 reads the particular quantization elements in matrix QM in a zigzag format, as controlled by a zigzag scan 48, from a DC component to higher frequency components, as shown by dotted lines in FIG. 2A. When the truncator 40 reads a preset number of particular quantization elements in matrix, a further zigzag reading from the matrix QM of block 38 is terminated. Thereafter, an end code, such as a zero, is added by an end code adder to the end of the preset number of particular quantization elements. The preset number is determined by a setting unit 39 operated manually by a user or automatically relatively to the type or quality of the picture. According to an example shown in FIG. 2A, the preset number is thirteen. Thus, there will be thirteen particular quantization elements being read out before the termination of the zigzag reading. These read out quantization elements are referred to as quantization elements in the former portion, since they are in the former portion of the zigzag reading of the particular quantization elements in matrix QM. The quantization elements in the former portion are sent to a synthesized QM generator 44, and the same quantization elements plus the end code are sent to a decoder shown in FIG. 5. A seires of these quantization elements in the former portion followed by the end code is called a simplified data QMt.

A default QM generator 46 is provided for storing default quantization elements aligned in matrix, such as shown in FIG. 1A. These default quantization elements are also read out in the zigzag form by the control of zigzag scan 48.

A synthesized QM generator 44 is provided for generating synthesized quantization elements in a matrix form. In the synthesized QM generator 44, the particular quantization elements in the former portion as obtained from the truncator 40, and the default quantization elements in a latter portion (a portion other than the former portion) from the default QM generator 46 are synthesized. Thus, the synthesized QM generator 44 uses the particular quantization elements in the former portion and the default quantization elements in the latter portion for synthesizing the synthesized quantization elements in matrix.

Figure 3:
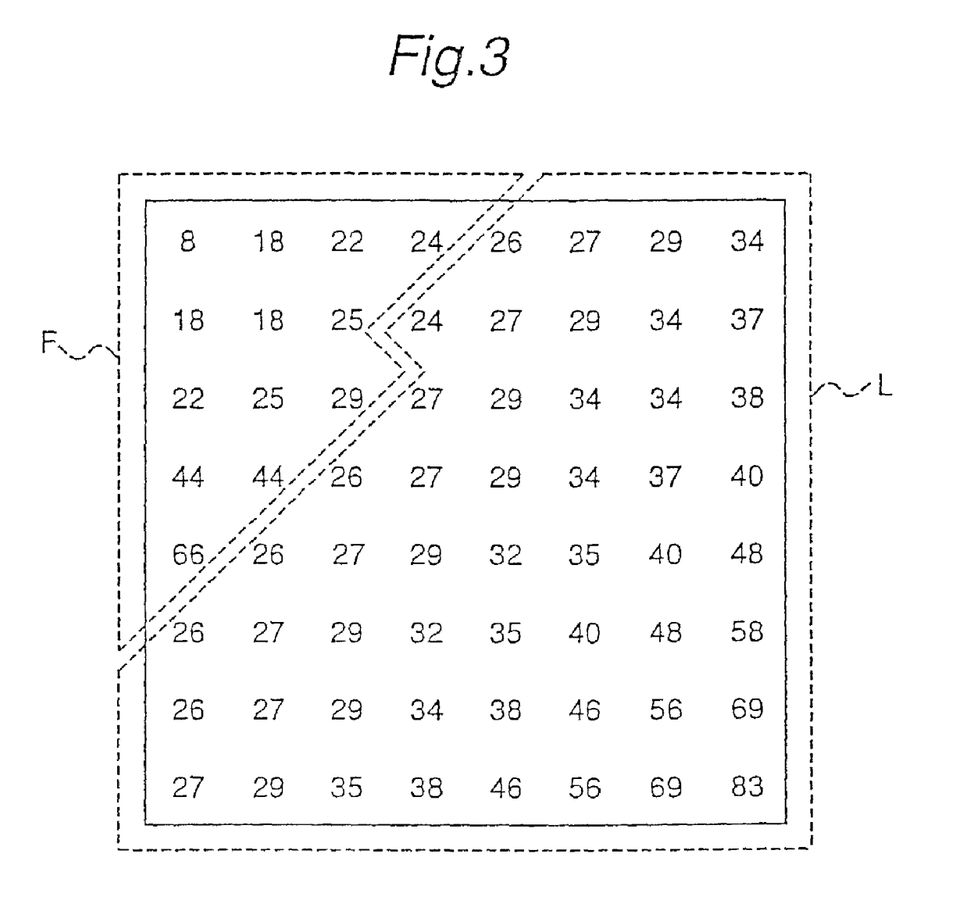
FIG. 3 shows a diagram of an example of synthesized quantization matrix according to the present invention.

FIG. 3 shows an example of a synthesized quantization elements in matrix in which the former portion F is filled with the particular quantization elements and the latter portion L is filled with the default qunatization values.

In the quantizer 34, the DCT coefficients COF in matrix format are quantized by using the synthesized quantization elements in matrix from the synthesized QM generator 44, and the quantization parameter QP from the QP generator 36. Then, the quantizer 34 generates quantized DCT coefficients COF' in matrix format. The coefficients COFij and COF'ij (i and j are positive integers between 1 and 8, inclusive) have the following relationship.

$$COF'_{ij} \propto \frac{COF_{ij}}{QM_{ij} * QP}$$

Here, QMij represent quantization elements in matrix as produced from synthesized QM generator 44, QP represent a quantization parameter as produced from QP generator 36. The quantized DCT coefficients COF' are then further coded in the variable length encoding unit 49, and the compressed video data VD is output from the unit 49 and applied to the decoder shown in FIG. 5.

Figure 5:
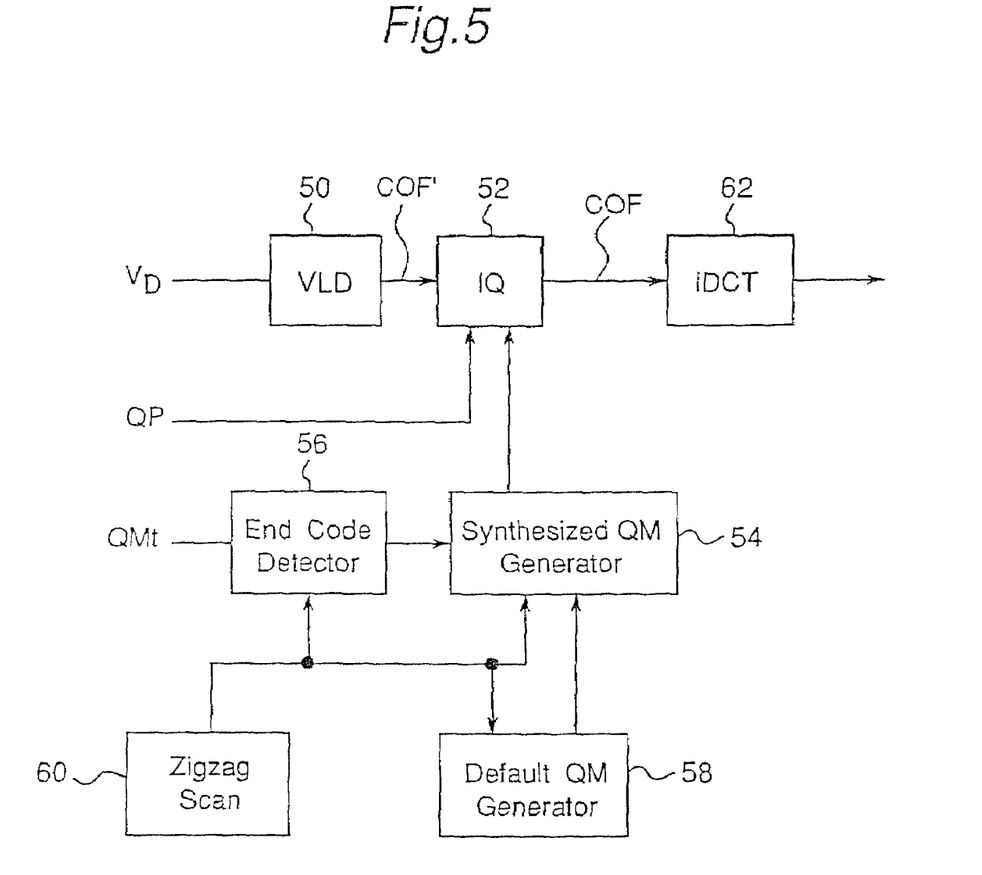
FIG. 5 is a block diagram of a decoder according to the present invention.

FIG. 5 shows a decoder, according to the present invention, using the quantization matrix for the still and moving pictures. The decoder includes a variable length decoding unit 50, an inverse quantizer 52, an inverse DCT converter 62, an end code detector 56, a synthesized QM generator 54, a default QM generator 58, and a zigzag scan 60.

The default QM generator 58 stores a default quantization matrix, such as that shown in FIG. 1A. It is noted that the default quantization matrix stored in the default QM generator 58 is the same one as that stored in the default QM generator 46 shown in FIG. 4. The synthesized QM generator 54 and the zigzag scan 60 are substantially the same as the synthesized QM generator 44 and the zigzag scan 48, respectively, shown in FIG. 4.

The video data VD transmitted from the encoder of FIG. 4 is applied to the variable length decoding unit 50. Similarly, the quantized parameter QP is applied to inverse quantizer 52, and the simplified data QMt is applied to the end code detector 56.

As described above, the simplified data QMt includes particular quantization element in the former portion in the matrix. The particular quantization elements are zigzag scanned by zigzag scan 60 and are stored in the former portion of the synthesized QM generator 54. Then, when the end code is detected by the end code detector 56, the supply of the particular quantization elements from the end code detector 56 terminates, and in turn, the default quantization elements from the default QM generator 58 zigzag scanned in the latter portion of the synthesized QM generator 54.

Thus, the synthesized quantization matrix generated in the synthesized QM generator 54 in FIG. 5 is the same as the the synthesized quantization matrix generated in the synthesized QM generator 44 in FIG. 4. Since the synthesized quantization matrix can be reproduced using the simplified data QMt, it is possible to reproduce the high quality image with less data to be transmitted from encoder to decoder.

Figure 6:
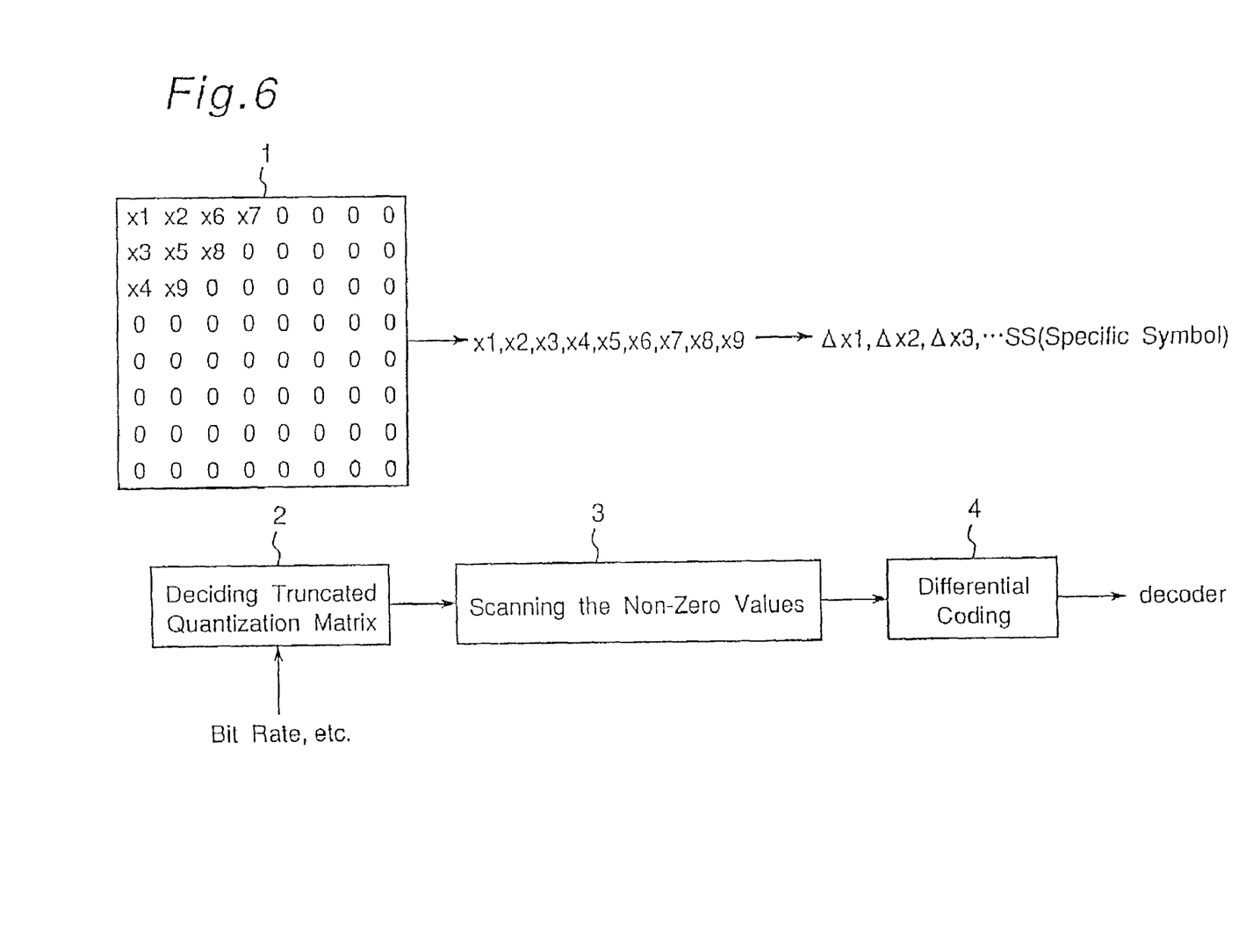
FIG. 6 is a block diagram showing one of the ways for encoding the truncated quantization matrix.

FIG. 6 shows one of the ways to code and transmit the truncated quantization matrix.

Here, the unit 1 is the truncated quantization matrix determined in the unit 2 by checking different coding bit rate, different coding picture size, etc. x1, x2, x3, . . . in unit 1 are those non-zero quantization matrix values used to quantize a block of 8×8 DCT coefficients in the same position as x1, x2, x3, . . . . Other parts of the quantization matrix with zero values in the unit 1 means that the default value of the quantization matrix will be used. In the encoder, same part of DCT coefficients of a 8×8 block will be set to zero.

The unit 3 is to scan the non-zero values in the unit 1 into a group of data with larger value being concentrated on the first part of the group. Zig-zag scan is shown here as an example.

The unit 4 shows the optional part to code the scanned data by subtracting neighbouring values to obtain the smaller difference values, $\Delta x1, \Delta x2, \ldots$, as shown in FIG. 6, maybe further followed by huffman coding or other entropy coding methods.

At the same time, the number of non-zero quantization matrix values is also coded and transmitted to decoder, together with those non-zero values. There are different ways to code this information. The simplest method is to code the number by using a fixed 8-bit. Another method is to code the number by using a variable length table which is designed to use less bits to handle the most frequent cases.

Alternatively, instead of coding and transmitting the number of non-zero quantization matrix values, as shown in FIG. 6, after the last non-zero value, xN, or last difference value, $\Delta xN$ (N=1, 2, 3, ...) is coded, a specific symbol is inserted into the bitstream to indicate the termination of the non-zero quantization matrix coding. This specific symbol may be a value which is not used in the non-zero value coding such as zero or a negative value.

Figure 7:
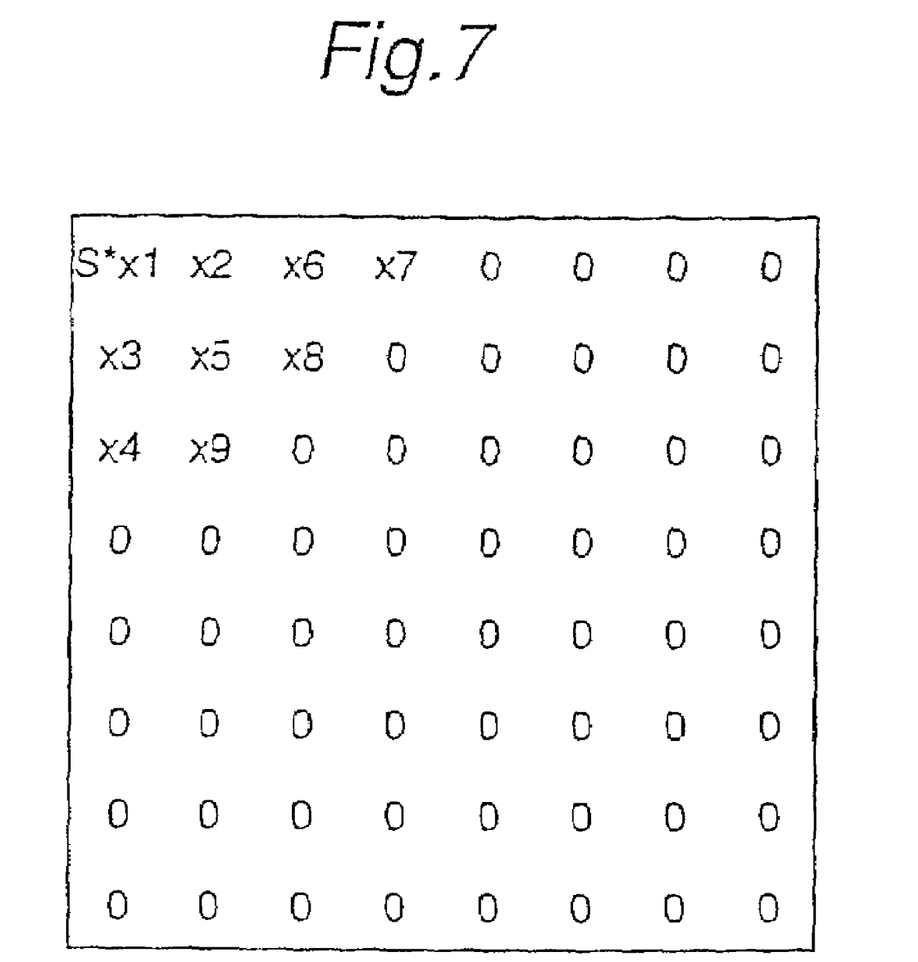
FIG. 7 shows a diagram of an example of a scaling truncated quantization matrix, which is to scale the value for DC only.

FIG. 7 is the truncated quantization matrix with scaling factor S as weighting for DC only. This scaling factor is adjusted based on the activity of individual block. The activity information can be obtained by checking the number of AC coefficients left after quantization. x1, x2, x3, ..., x9 are the non-zero values in the truncated quantization matrix to be used to quantize 8×8 DCT coefficient block, and S is the weighting for scaling up/down for the first value to adjust the quantizer for DC coefficient.

Figure 8:
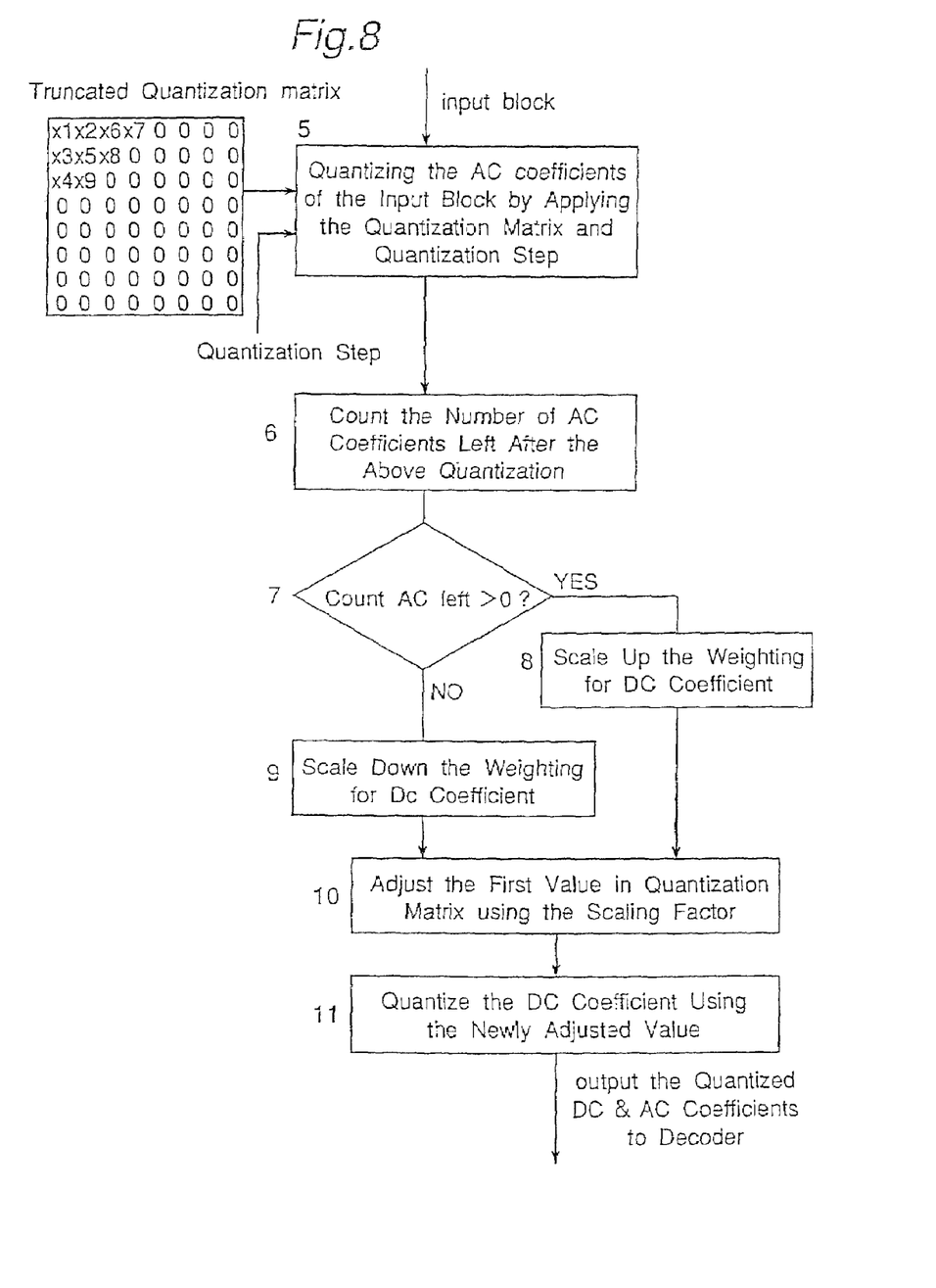
FIG. 8 is a flow chart showing the scaling procedure for DC coefficient in a truncated quantization matrix.

FIG. 8 shows the details about the scaling procedure for the first value in quantization matrix.

The unit 5 quantizes each of 8×8 block by applying the truncated quantization matrix first, followed by the required quantization step at that time for that block. The unit 6 checks the number of AC coefficients left after the above quantization, passing to the unit 7 to decide whether the weighting S in FIG. 7 is scaled up or down. If more AC coefficients left after the quantization done in the unit 5, then the weighting S can be scaled up, shown in the unit 8; otherwise scaled down, shown in the unit 9. The unit 10 scales the weighting S to adjust the first value in the quantization matrix, and the unit 11 re-quantizes the DC coefficient by using the new adjusted value for block A and output all the DC & AC coefficients to decoder.

The scaling up & down can be chosen some value related to the present quantization step or a fixed value.

The adjustment of the other quantization matrix values for AC coefficients can be followed the similar way.

Figure 9:
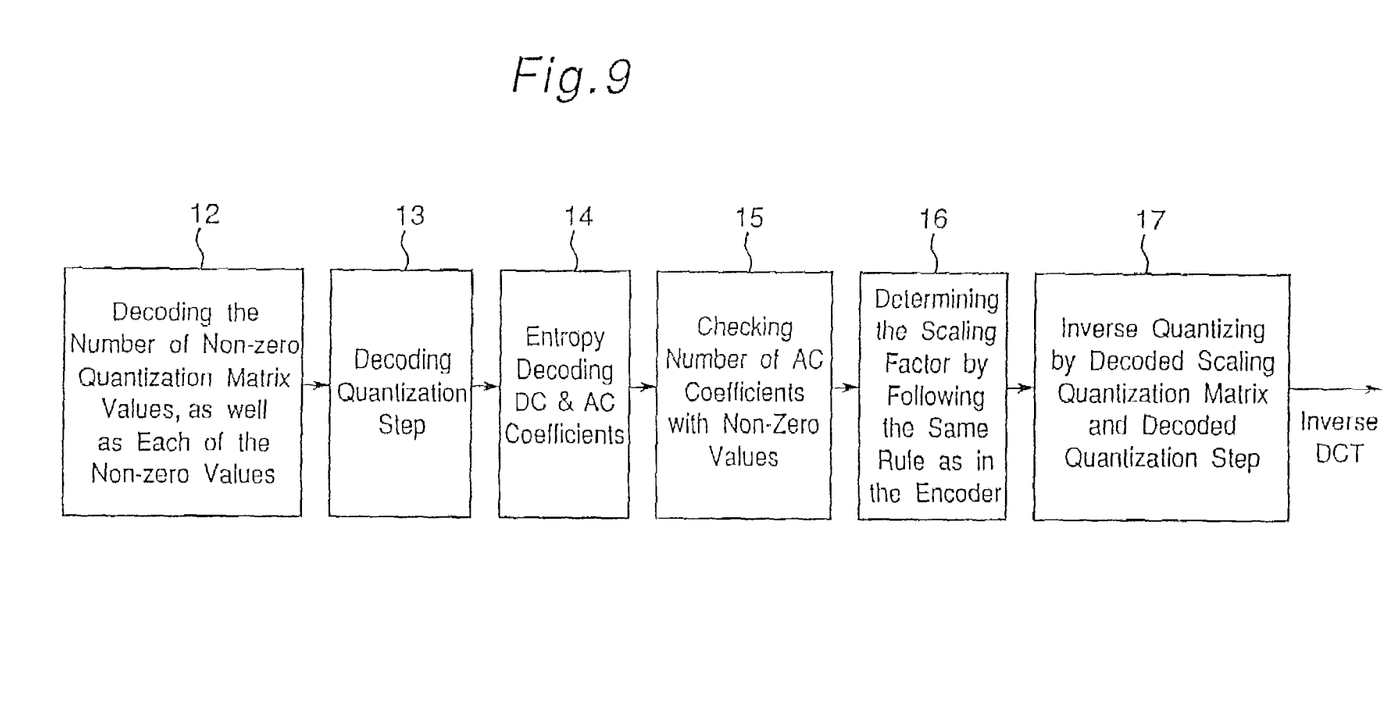
FIG. 9 is a block diagram of a decoder for decoding the scaled truncated quantization matrix.

A decoder of the adaptive quantization step size scaling and truncated quantization matrix is shown in FIG. 9.

In the FIG. 9, the decoded bitstream is input to the decoder. The unit 12 will decode the truncated quantization matrix, and the unit 13 will decode the quantization step for each of block. The unit 14 will decode all the DC & AC coefficients for each of block. The unit 15 will check the number of AC coefficients which are not zero, and the scaling factor can be determined in the unit 16 by using the information obtained from the unit 15 and following the same criteria as in the encoder. All DC & AC coefficients for each of block can be inversely quantized in the unit 17 by the decoded scaling quantization matrix and the decoded quantization matrix. Finally all the inversely quantized coefficients are passed to an inverse DCT transform coding unit to reconstruct image picture.

The following formula are used for the quantization and inverse quantization:

Quantization:

For Intra DC:     Level = |COF| // (QM/2)
For Intra AC:     Level = |COF| * 8/(QP*QM)
For Inter:     Level = (|COF| − (QP*QM/32)) * 8/(QP*QM)
Inverse Quantization:
For Intra DC:     |COF'| = Level * QM/2
For Others: |COF'| = 0,
    if Level = 0
|COF'| = (2 * LEVEL + 1) * (QP*QM/16),
    if LEVEL ≠ 0, (QP*QM/16) is odd
|COF'| = (2 * LEVEL + 1) * (QP*QM/16) − 1,
    if LEVEL ≠ 0, (QP*QM/16) is even Where:
COF is the transform coefficient to be quantized.
LEVEL is the absolute value of the quantized version of the transform coefficient.
COF' is the reconstructed transform coefficient.
QP is the quantization parameter of the current block.
QM is the value of the quantization matrix corresponding to the coefficient to be quantized.
Default value of QM is 16.

The presented invention is to make quantization matrix adaptively changed according to coding bit rate, coding size, as well as human visual system, so that a lot of bits can be saved by truncating and scaling the quantization matrix and encoding the values of the matrix differentially. Therefore it will increase coding efficiency, especially for very low bit rate coding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A transmission method for transmitting a coded picture obtained by coding a picture, the transmission method comprising:
 transmitting coded quantized coefficients obtained by coding quantized coefficients which are obtained by quantizing coefficients of the picture using a complete quantization matrix; and
 transmitting a coded quantization matrix which is obtained by truncating and coding said complete quantization matrix having a plurality of quantization elements.

2. The transmission method according to claim 1, wherein the coded quantization matrix has bits aligned in an order of bits obtained by truncating and coding the quantization elements included in the complete quantization matrix and bits obtained by coding an end code.

3. A transmission method for transmitting a coded picture obtained by coding a picture, the transmission method comprising:
 quantizing AC coefficients using a truncated quantization matrix, to obtain quantized AC coefficients;
 counting a number of remaining quantized AC coefficients;
 scaling a DC quantization element of the truncated quantization matrix based on the number of the remaining quantized AC coefficients;
 transmitting the quantized AC coefficients and a quantized DC coefficient which is quantized using the scaled DC quantization element, and
 transmitting a coded quantization matrix obtained by coding the truncated quantization matrix.

* * * * *